(12) United States Patent
Ording et al.

(10) Patent No.: US 7,413,262 B2
(45) Date of Patent: Aug. 19, 2008

(54) HUB FOR WHEEL OF HUMAN POWERED VEHICLE

(75) Inventors: Andrew Ording, Carmel, IN (US); Joshua R. Poertner, Brentwood, TN (US)

(73) Assignee: Compositech, Inc, Speedway, IN (US)

( * ) Notice: Subject to any disclaimer, the term of this patent is extended or adjusted under 35 U.S.C. 154(b) by 0 days.

(21) Appl. No.: 11/758,062

(22) Filed: Jun. 5, 2007

(65) Prior Publication Data

US 2007/0228808 A1   Oct. 4, 2007

Related U.S. Application Data (63) Continuation-in-part of application No. 10/679,176, filed on Oct. 3, 2003, now Pat. No. 7,114,785.

(60) Provisional application No. 60/811,491, filed on Jun. 7, 2006.

(51) Int. Cl.
*B60B 27/04* (2006.01)

(52) U.S. Cl. .................. 301/110.5; 244/130; 296/181.5

(58) Field of Classification Search ............. 301/105.1, 301/110.5, 110.6; 244/130; 296/181.5
See application file for complete search history.

(56) References Cited

U.S. PATENT DOCUMENTS

| 697,118 | A | 4/1902 | Van Horn |
|---|---|---|---|
| 810,860 | A | 1/1906 | Heart |
| 1,420,097 | A | 6/1922 | Harvey |
| 1,447,927 | A | 3/1923 | Crawford |
| 1,968,005 | A | 7/1934 | Swain |
| 1,969,088 | A | 8/1934 | Maranville |
| 3,452,798 | A | 7/1969 | Ravreby |
| 3,656,531 | A | 4/1972 | Ross et al. |
| 3,732,951 | A | 5/1973 | Hata et al. |
| 3,862,779 | A | 1/1975 | Jayne |
| 4,280,736 | A | 7/1981 | Raudman |

(Continued)

FOREIGN PATENT DOCUMENTS

DE   30 16 862   11/1981

(Continued)

OTHER PUBLICATIONS

Compositech, Inc., ZIPP website reprint (www.Zipp.com), 1998, from web.archieve.org/web.

(Continued)

*Primary Examiner*—Jason R Bellinger
(74) *Attorney, Agent, or Firm*—E. Victor Indiano; Indiano Vaughan LLP (57) ABSTRACT

A hub for a human powered vehicle includes a rotation axis, a hub body formed generally symmetrically about the rotation axis, the hub body having a radially-outward-facing surface that includes a plurality of surface features for improving the aerodynamic efficiency of the hub as it passes through a fluid, and a wheel assembly attachment member formed along a circumference of the hub body, the wheel assembly attachment member being structured for attachment to one of a plurality of spokes and the center of a disc wheel. The surface features may include a series of depressions or a series of projections, and such features may have a dimple shape that can be formed in a variety of shapes including those with a cylindrical wall and a planar bottom or a hemispherical bottom. Alternately, such surface features may have a hemispherical shape.

28 Claims, 10 Drawing Sheets

U.S. PATENT DOCUMENTS

| | | |
|---|---|---|
| 4,284,302 A | 8/1981 | Drews |
| 4,508,392 A | 4/1985 | LeBlond et al. |
| 4,620,749 A | 11/1986 | McEachern |
| 4,639,046 A | 1/1987 | Oleff et al. |
| 4,660,893 A | 4/1987 | Huntzinger |
| 4,732,428 A | 3/1988 | Monte |
| 4,793,659 A | 12/1988 | Oleff et al. |
| 4,835,857 A | 6/1989 | Michelotti |
| 4,844,552 A | 7/1989 | Tsygankov et al. |
| 4,919,490 A | 4/1990 | Hopkins et al. |
| 5,975,645 A | 11/1999 | Sargent |
| 6,991,298 B2 | 1/2006 | Ording et al. |
| 7,114,785 B2 * | 10/2006 | Ording et al. ......... 301/63.106 |

OTHER PUBLICATIONS

ZIPP 145 Front Mountain Bike Hub, ZIPP website reprint ( www.Zipp.com), 1997, from web archieve.org/web.

ZIPP Track Hubs, ZIPP website reprint (www.Zipp.com), 1997, from web archieve.org/web.

ZIPP 217 Cassette Hub, ZIPP website reprint (www.Zipp.com), 1997, from web archieve.org/web.

ZIPP 100 Front Road Hub, ZIPP website reprint (www.Zipp.com), 1997, from web archieve.org/web.

* cited by examiner

HUB FOR WHEEL OF HUMAN POWERED VEHICLE

REFERENCE TO RELATED APPLICATIONS

This application is a continuation-in-part of a U.S. patent application Ser. No. 10/679,176 filed Oct. 3, 2003 that has since matured into U.S. Pat. No. 7,114,785 (the "Ording '785 Patent) the entire contents of which are herein incorporated by reference. This application also claims benefit of U.S. Provisional Patent Application No. 60/811,491, filed on 7 Jun. 2006, the entire contents of which is also incorporated by reference.

I. TECHNICAL FIELD OF THE INVENTION

The present invention relates to human powered vehicles and more particularly, to a hub intended for use as a component wheel of a human powered vehicle such as a bicycle or wheel chair, where use of the hub has aerodynamic benefits.

II. BACKGROUND OF THE INVENTION

Technology underlying the design of bicycle components has evolved in recent years. Increasingly, bicycle wheels, hubs, cranks, handlebars, frames and the like, are being designed not only to be sturdy and easy to manufacture, but also to have increasingly lighter weight and improved performance characteristics. A variety of techniques have been used to achieve lighter weights, with most of the design efforts being centered on the choice of materials from which the individual bicycle components are made. In particular, other techniques employed in the manufacture of bicycle hubs include improving the quality of the bearings used in the hubs, and improving the tolerances of the bearing and race assemblies. A typical result of such techniques, for example, may be a reduction in the frictional resistance related to the hub's rotation about the axle of the wheel.

Figure 1:
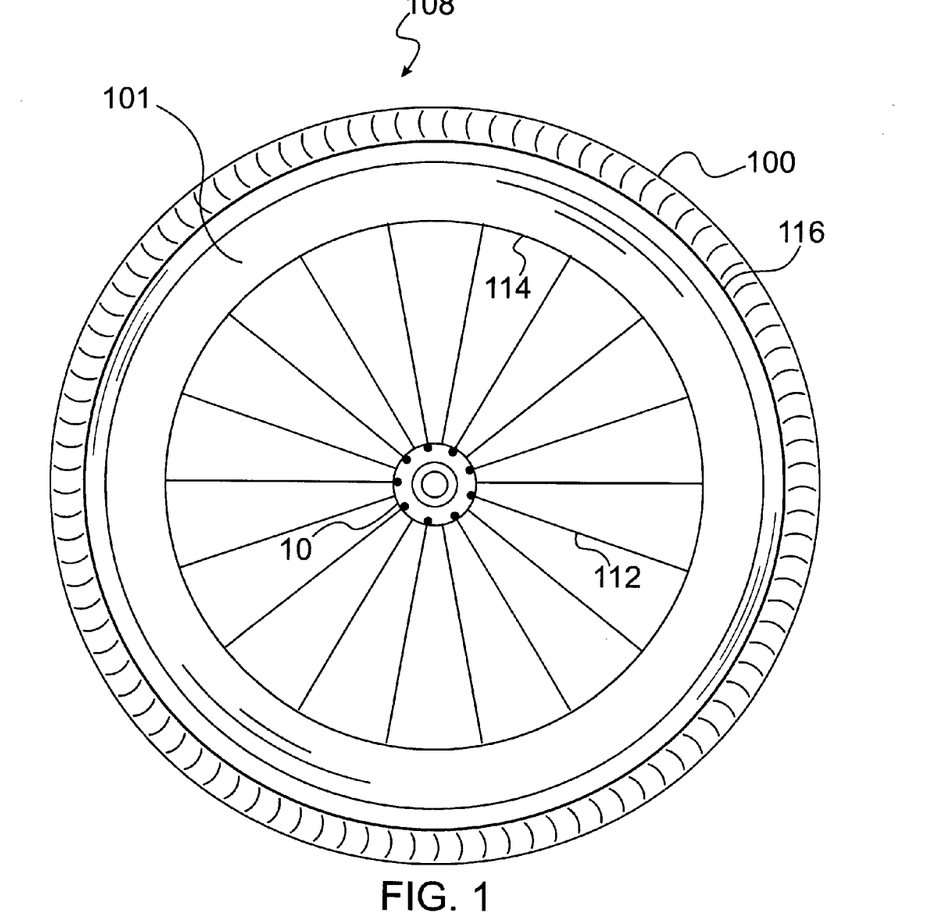
FIG. 1 is a representation of a wheel and rim assembly of a non-driving wheel of a human-powered vehicle of a type with which the hub of the present invention could be used.
Figure 2:
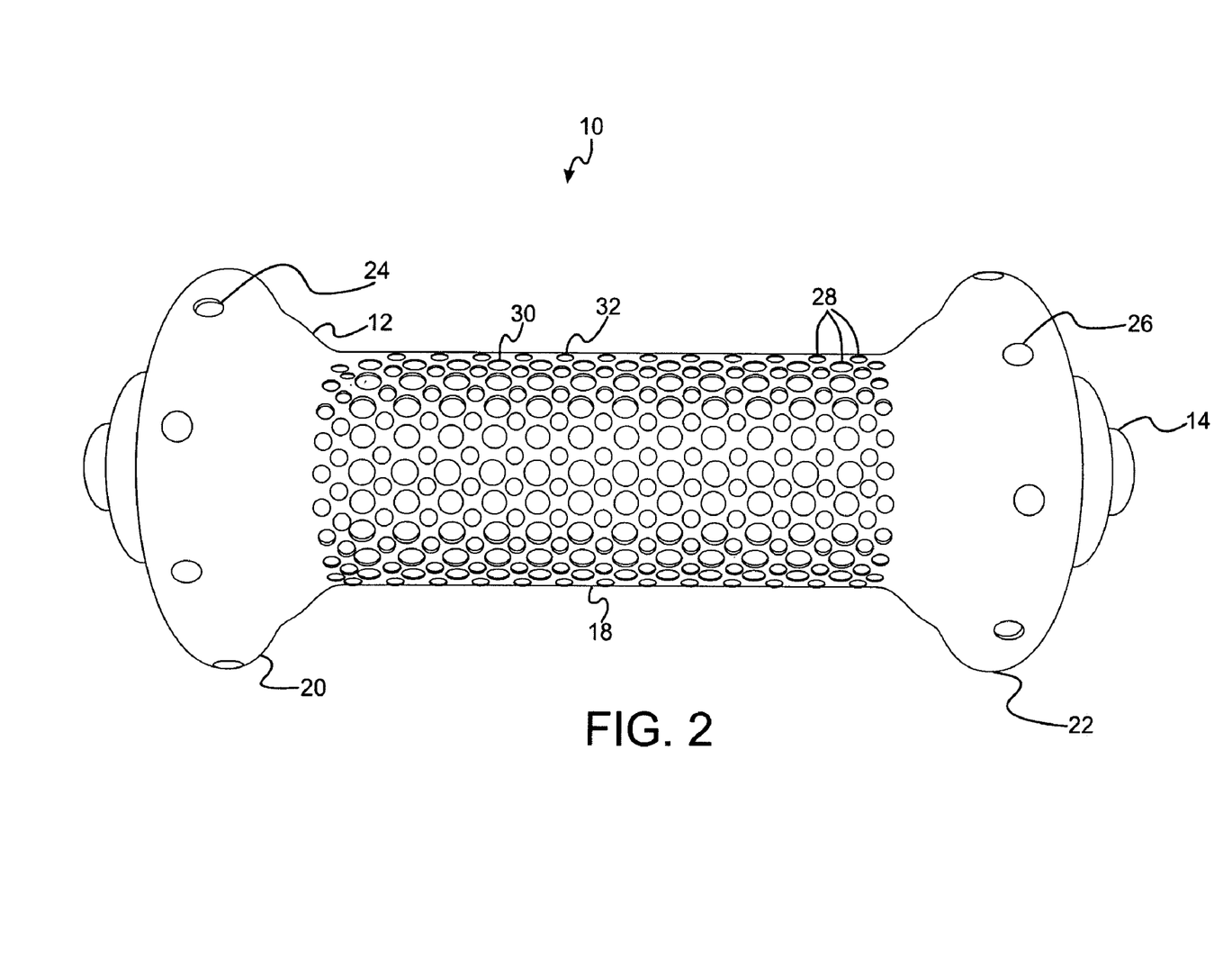
FIG. 2 is a frontal view of a front wheel hub designed for use primarily with a non-driving wheel of a human powered vehicle, such as a bicycle front wheel, according to an exemplary embodiment of the present invention.

Currently, two primary types of bicycle wheels are used, namely disc and spoke wheels. Examples of disc-shaped wheels include the models 900, 909 and 999 disc wheels sold by Compositech, Inc. of Speedway, Ind. under its ZIPP® SPEED WEAPONRY® brand. An example of such a disc-shaped wheel is also shown in FIGS. 1 and 2 of the Applicant's co-pending Ording '785 Patent. Although the ZIPP Wheels are used mostly on bicycles, they may also be used on other human-powered vehicles such as wheel chairs.

A disc wheel is a wheel that includes a hub at its center and a wheel body having a solid, generally planar disc-shaped surface that extends from the central hub to the perimetral tire engaging surface of the wheel. Although disc wheels are far less commonly used than spoke type wheels, disc wheels are much more aerodynamically efficient wheels and are used by bicycle racers in time trial events, sprint events, and track events, because of their highly prized low aerodynamic resistance properties.

The second typical type of human-powered vehicle wheel is a spoke-type wheel. A spoke-type wheel is disclosed and discussed in Ording and Poertner, U.S. Pat. No. 6,991,298, issued on 31 Jan. 2006, and assigned to the Assignee of the instant invention.

A spoke-type wheel includes an endless ring shaped rim and a central hub. A plurality of spokes extend between the centrally positioned hub and the ring shaped rim to connect the hub and rim, so that the rim is supported about the central hub. Individual spokes may be tightened so that this rim support is kept nearly the same at individual points around the rim. Such a tightening process may be part of a tuning procedure for a wheel that may also include balancing the wheel using weights, alignment, etc. Although spoke-type wheels do not have aerodynamic resistance properties as low as those for disc wheels, they are far more commonly used than disc wheels because they provide better all around performance in non-controlled conditions, such as one would encounter when riding on an open road. For example, a disc wheel may suffer the disadvantage of acting as a "sail" which, because of its large surface area, tends to cause instability for a bicycle when cross winds are encountered.

Common to both wheel types is the use of a hub at the center of the completed wheel.

As noted in the Ording '176 Application, the Applicants discovered that adding surface features to either a disc or spoke-type wheel helps to improve the aerodynamic efficiency of the wheel, by lowering the aerodynamic resistance of the wheel as the wheel moves forward through the air when a bicycle is being ridden.

The Applicants have found that the design and use of aerodynamic surface features in a hub member can also provide significantly improved properties to the bicycle wheel.

III. SUMMARY OF THE INVENTION

According to an aspect of the present invention, a hub is provided for a human powered vehicle. The hub comprises a rotation axis, and a hub body formed generally symmetrically about the rotation axis. The hub body has a radially-outward-facing surface that includes a plurality of surface features designed to create a turbulent boundary layer when the hub travels through air for improving the aerodynamic efficiency of the hub as it passes through a fluid such as air. A wheel assembly attachment member is formed along a circumference of the hub body. The wheel assembly attachment member is structured for attachment to one of a plurality of spokes and the center of a disc wheel.

Preferably, the hub includes a hub shaft that can be coupled to a bicycle frame. A hub shell is rotatable with respect to the hub shaft. The hub shell includes an external cover portion and a support member for fixedly engaging the hub to a tire engaging member, such as a ring shaped rim, (or disc-shaped rim) of the wheel set. The cover portion includes the plurality of surface features designed to create a turbulent boundary layer when the hub travels through the air to reduce aerodynamic drag on the hub.

Additionally, a hub according to the invention is preferably provided that has a rotation axis that is disposed coaxially with respect to a wheel axle of a human powered vehicle. The rotating hub and corresponding axle move in a direction generally orthogonal to the rotation axis as the vehicle is propelled along by the human.

Drag is the air resistance that exerts itself in the direction opposite to the hub's direction of movement, and thus to the bicycle's direction of movement. As the hub travels through the air, the air that surrounds the hub has different velocities and thus, different pressures. The air exerts maximum pressure at a stagnation point on the front of the hub. The air then flows around the cover portion of the hub with an increased velocity and reduced pressure.

At some separation point, the air separates from the cover portion surface and generates a large turbulent flow area behind the hub. This flow area, referred to herein as the wake, has a low pressure. The pressure difference between the high pressure at the front of the hub and the low pressure behind the hub slows down the hub, and hence, the bicycle. This pressure difference constitutes a primary source of drag for the hub, and a significant source of drag for the bicycle wheel and bicycle as a whole.

All objects moving through air have a thin layer, called the boundary layer, of air surrounding them. This occurs in objects whose shapes range from blunt to stream-lined. Blunt objects create large wakes behind them that, in turn, create greater drag. More stream-lined objects create a smaller wake and, therefore, less drag. The surface features on the hub cause the formation of a thin layer of boundary air adjacent to the hub's outer surface (its cover portion) to become turbulent. This turbulence energizes the boundary layer and helps keep the boundary layer of air attached to the sides of the hub, thus moving the separation point further backward on the hub.

The surface features also reduce the size of the wake behind the hub, to thereby create a more stream-lined and aerodynamic air flow. As a result, there is a reduction in the area of the wake behind the hub that increases the pressure behind the hub and substantially reduces the aerodynamic drag. It is the surface features of the hub of the present invention that create the turbulence and the boundary layer and reduce the aerodynamic drag.

In a preferred embodiment, the surface features include a series of depressions that may include a series of dimple-shaped depressions. These depressions may comprise depressions having cylindrical walls and either planar or hemispherical bottoms; or, they may include hemispherical shaped dimples. Multiple sized depressions are preferred in order to pack more depressions on to the surface of the hub.

In one embodiment, the different shaped depressions extend generally along the cylindrical portion of the hub between the first and second flange portions of the hub that are disposed, respectively, at the first and second ends of the hub. In another embodiment, the depressions are placed on bell-shaped first and second cover portions of a hub designed for use primarily with disc-shaped wheels.

In another aspect of the present invention, the air-engaging cover portion of the hub includes an array of surface features, such as dimple-shaped depressions. The dimple-shaped depressions provide a distinct aerodynamic advantage. The covering of dimples on the air-engaging cover portion surface creates a thin layer of air next to the hub that comprises the boundary layer. The boundary layer of air becomes turbulent in its flow patterns over the surface features of the air engaging surfaces of the hub. Rather than flowing in smooth continuous layers over the air-engaging surface of the hub, the dimples cause the air to have a microscopic pattern of fluctuations and randomized flow.

This "turbulence" in the boundary layer enables the air flowing around the air-engaging surface of the hub to better follow the surface of the air-engaging surface, and enables the air to travel further along the air-engaging surface of the hub. This creates a much smaller wake at the "down-wind" end of the hub. This reduced wake results in a significant reduction in the aerodynamic drag of the hub.

According to another aspect of the invention, a hub shell may include first and second cover portions adapted for coaxially securing a disc type wheel body to the hub, where the series of depressions are disposed on at least one of the first and second cover portions. In an exemplary embodiment, at least one of the first and second cover portions is formed with a bell-shaped profile. Optionally, such first and second cover portions are formed to removeably interlock with one another. For example, the first and second cover portions may be respectively formed as a bolt and nut having matingly compatible threads. In another alternative example, the surface features include a series of protrusions.

In another aspect of the invention, a hub for a human powered vehicle is provided. The human powered vehicle has a wheel shaft coupled to a frame of the vehicle. The hub includes a hub shell rotatable with respect to the wheel shaft, and the hub shell includes an external cover portion and a support member for fixedly connecting the hub to a tire engaging member. The external cover portion includes a plurality of surface features designed to create a turbulent boundary layer when the hub travels through air to reduce aerodynamic drag.

In such a case, the plurality of surface features includes at least first and second sets of dimples, wherein the dimples of each respective set are identically shaped with respect to one another. In a given embodiment, the cover portion has an exterior surface, and the dimples each have a diameter defined at a respective dimple opening along the exterior surface, where the diameters of the dimples of the first set are larger than the diameters of the dimples of the second set.

Dimples of the first set may be interspersed in an alternating arrangement with the dimples of the second set. Dimples of the first set may be positioned in groups of first rows, so that the dimples of the second set are positioned in groups of second rows, where the alternating arrangement is defined as an alternating of the first and second rows along a circumference of the cover portion.

Other configurations of dimples are envisaged. For example, a third set of dimples may be positioned in at least one ring around the circumference of the cover portion. Optionally, the dimples of the third set are identically shaped with respect to one another. Surface features may include a plurality of multi-sided polygonally shaped surface features arranged as a first pattern in a first zone and a second pattern in a second zone located radially outward from said first zone. The density of surface features in such a second zone may be greater than density of surface features in the first zone.

These and other features will become apparent upon review of the drawings and detailed description, presented below, which set forth the preferred embodiments of practicing the invention perceived presently by the Applicant. The foregoing summary does not limit the invention, which is defined by the attached claims. Similarly, neither the Title nor the Abstract is to be taken as limiting in any way the scope of the disclosed invention.

V. DETAILED DESCRIPTION

Referring to FIG. 1, a human powered vehicle wheel assembly 108 is shown of the type with which a hub 10 of the present invention can be used. The illustrated example is a spoke-type wheel assembly. Wheel assembly 108 has a deep profile rim 101, that includes a radially inwardly facing surface 114, and a tire engaging radially outwardly facing surface 116. Rim 101 is generally ring-like in configuration, and engages a tire 100 at a tire engaging radially outwardly facing surface 116 of the rim 101. A deep profile rim 101 may be formed, for example, of aluminum and carbon fiber, steel, or other suitable materials. A series of spokes 112 extend between the radially inwardly facing surface 114 of the rim 101 and a centrally disposed hub 10.

Hub 10 as illustrated in FIG. 2 is useable on a non-driving wheel of a human powered vehicle, such as the front wheel of a spoke-type bicycle wheel 108 (FIG. 1). Wheel hub 10 includes a hub shell 12 that is designed for receiving a hub shaft 14 (also referred to as a wheel shaft) within a shaft receiving internal passageway 15. Internal passageway 15 is defined by the radially inwardly facing surface of the shaft receiving internal passageway 15. Preferably, a single axle is used as hub (wheel) shaft 14, and a plurality of bearings and the like may be used within internal passageway such as for improving rotational stability. Alternatively, a bearing and race assembly may be used to permit the hub shell 12 to rotate relative to the hub shaft 14.

Hub shaft 14 is designed for being fixedly coupled to a bicycle frame 17 (FIG. 2A), and is typically coupled to the lower most ends 13 of the front forks 191 of the bicycle by a fastener such as a quick release mechanism 21. As shown in FIG. 1, Hub shell 12 is fixedly coupled to a bicycle rim 101 by spokes 112, so that rotational movement of hub shell 12 permits rotational movement of rim 101, so that both rotate together about the fixedly positioned hub shaft 14.

Figure 3:
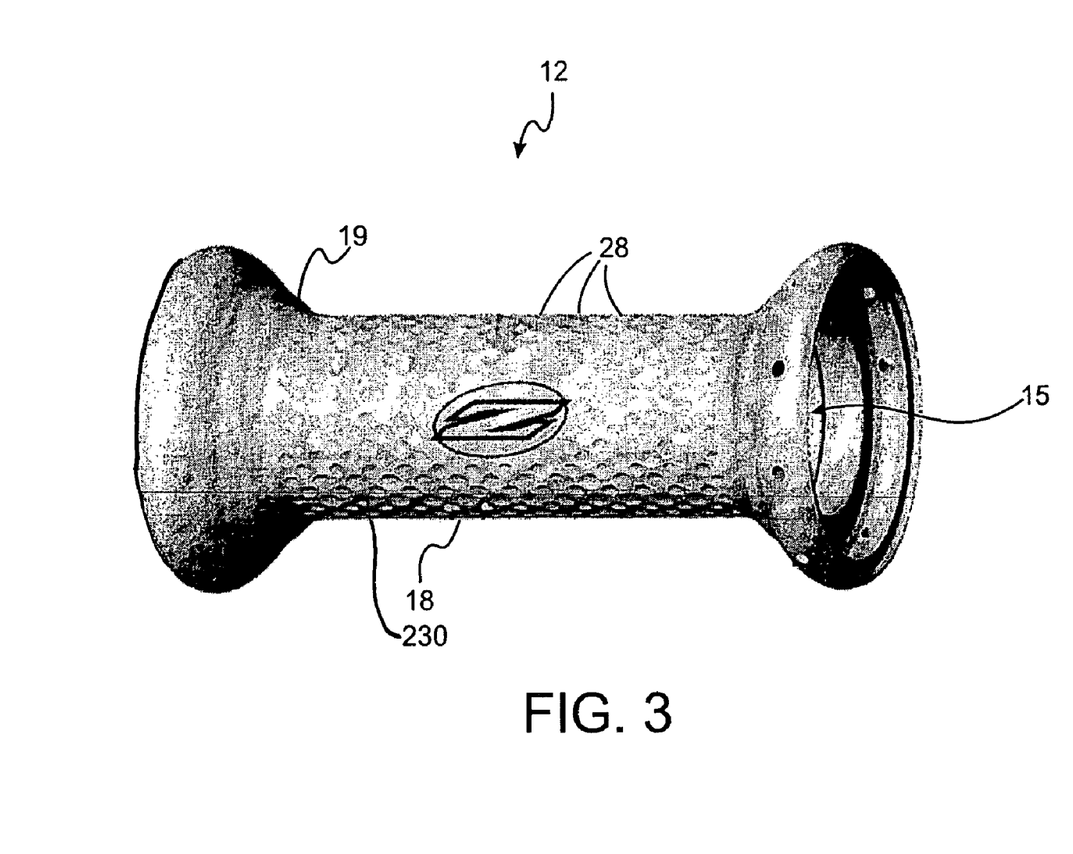
FIG. 3 is a perspective view of a sleeve-type cover for a front wheel hub, according to an exemplary embodiment of the present invention.

The hub shell 12 shown in FIGS. 2-3 includes a cylindrical center portion 18 having a first flange portion 20 disposed at one end of the cylindrical center portion, 18, and a second flange portion 22 disposed at a second end of cylindrical center portion 18. It will be noted that each of the first and second flange portions 20, 22, have a relatively larger diameter, when compared to the relatively smaller diameter cylindrical center portion 18, preferably about one and a half to three times the center diameter. The first flange portion 20 includes an array of evenly spaced and radially outwardly opening first flange apertures 24. Similarly, the second flange 22 includes an array of radially outwardly opening second flange apertures 26.

First and second flange apertures 24, 26 are each designed for receiving the proximal ends of the spoke members are received by a series of apertures formed in the bicycle rims 101 (FIG. 1). See also, e.g., the Ording '298 Patent and Sargent, U.S. Pat. No. 5,975,645. Although the present illustrations might suggest that the apertures 24, 26 are disposed at angles that are perpendicular to the central axis of the hub shell 12, such is not the case. Actually, apertures 24, 26, while opening radially outwardly, are angled slightly from such a perpendicular, so that a spoke placed within the given aperture will be angled at an appropriate angle whereby the distal ends of the respective spokes intersect at the corresponding center point of the radially inwardly facing surface of the bicycle rim 101. Exact positioning of apertures 24, 26 maintains concentricity of hub 10 with respect to rim 101 and such positioning may assist in also reducing unnecessary lateral torsional stresses on wheel assembly 108.

It should be noted that the exemplary drawings are schematic in nature and, accordingly, both first flange 20 and second flange 22 flange will each preferably contain an array of apertures, such as apertures 24, 26 in the preferred or other configuration. For example, it is possible to form a spoke-type wheel using arrangements of spokes that are alternately connected to a first flange then to a second flange. It will be apparent that other spoke arrangements may also be used.

A plurality of surface features, here shown as dimples 28, are formed in the exterior surface of the cylindrical center portion 18 of the hub 10.

Although dimples are shown in the illustrated exemplary embodiments, it should be understood that other surface features, such as a series of protrusions 27 (FIG. 8A), may alternatively be used to create a turbulent boundary layer as a hub travels through air, to thereby reduce the aerodynamic drag on such hub, as will be apparent to those skilled in the art. For example, such protrusions 27 may be formed in a shape of sections of truncated cones, prisms, domes and others of either regular (e.g., hexagonal) or irregular dimensions.

Dimples 28 preferably comprise dimples of different sizes, including a plurality of relatively larger sized dimples 30 that are interspersed in an alternating arrangement with a plurality of relatively smaller diameter dimples 32. Although dimples of only one size may be used, it has been found by the Applicants that using alternating large 30 and small 32 diameter dimples helps to increase the "dimpled surface area" of the hub, when compared to the use of only larger dimples 30, or smaller dimples 32 by themselves. The dimpled surface area extends generally between first flange 20 and second flange 22, on hub 10. However, it will also be appreciated that the dimpled surface area could cover the entire surface of the central portion 18 along with the total surface area of the first and second flanges 20, 22.

Figure 2A:
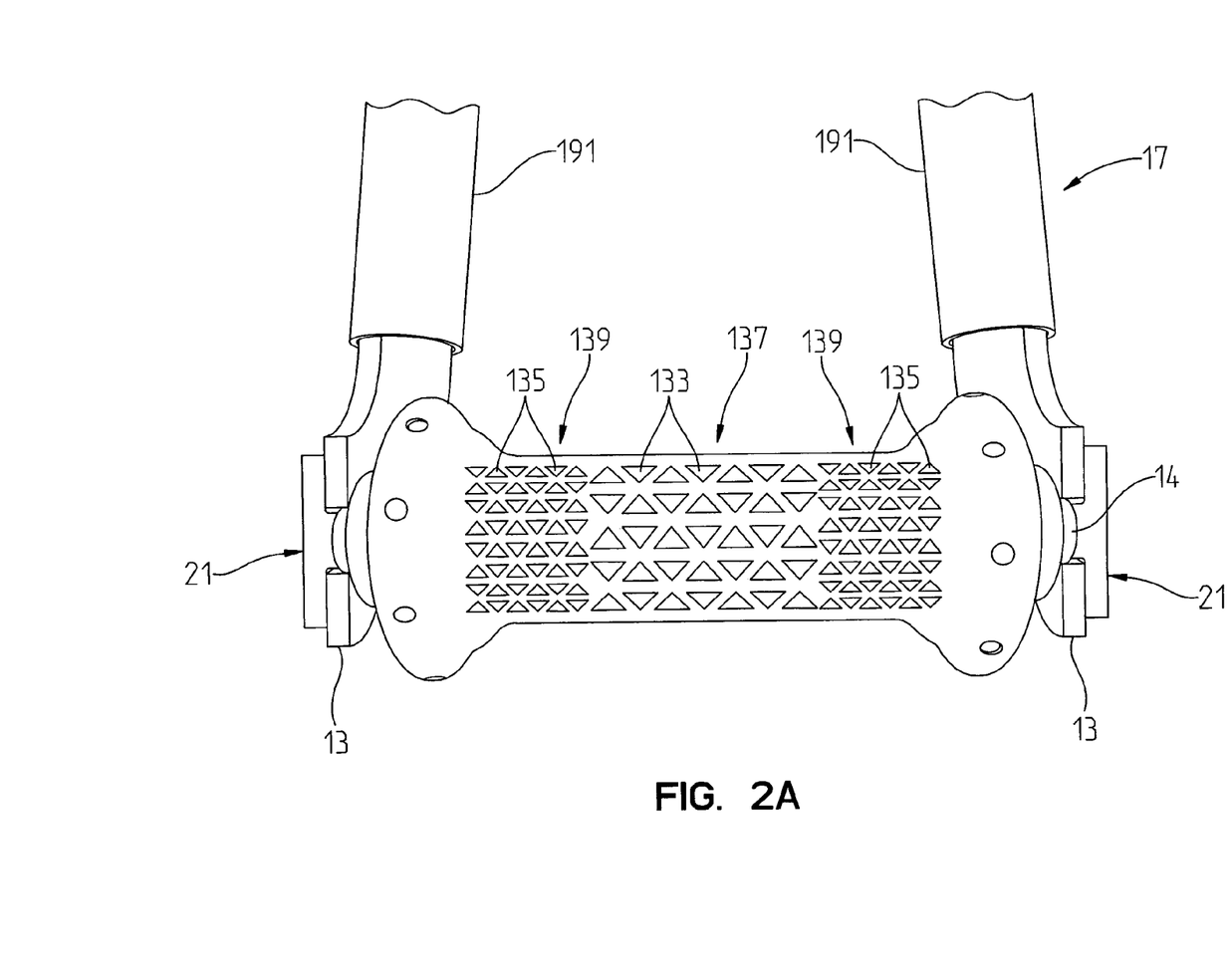
FIG. 2A is a frontal view of a front wheel hub designed for use primarily with a non-driving wheel similar to FIG. 2, which also shows the hub coupled to a bicycle frame and which shows an alternate embodiment two zone polygonal dimple configuration.

As best shown in FIG. 2A, surface features may include a plurality of multi-sided polygonally shaped surface features 133, 135 arranged as a first pattern in a first zone 137, and a second pattern in a second zone 139 located radially outward from said first zone 137. The density of surface features in such a second zone 139 may be greater than density of surface features in the first zone 137.

Figure 8:
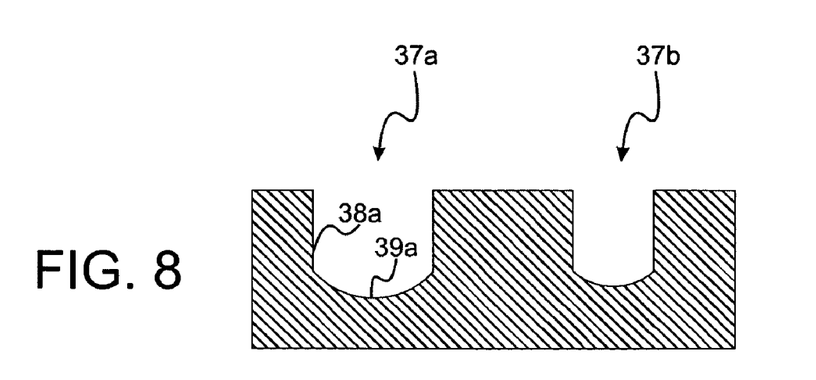
FIG. 8 is a sectional view, similar to FIG. 7, showing cylindrical dimples having hemispherical bottom surfaces, according to an exemplary embodiment of the present invention.
Figure 8A:
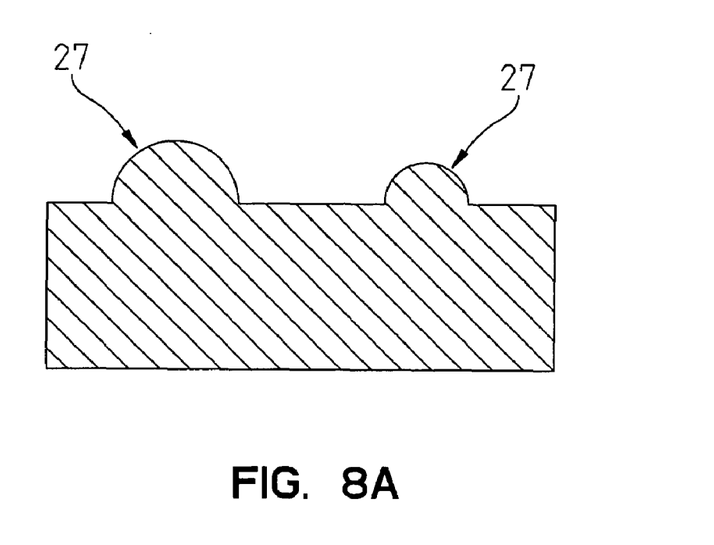
FIG. 8A is a sectional view, similar to FIG. 7, except that it shows the use of a series of protrusions instead of dimples, according to an exemplary embodiment of the present invention.
Figure 8B:
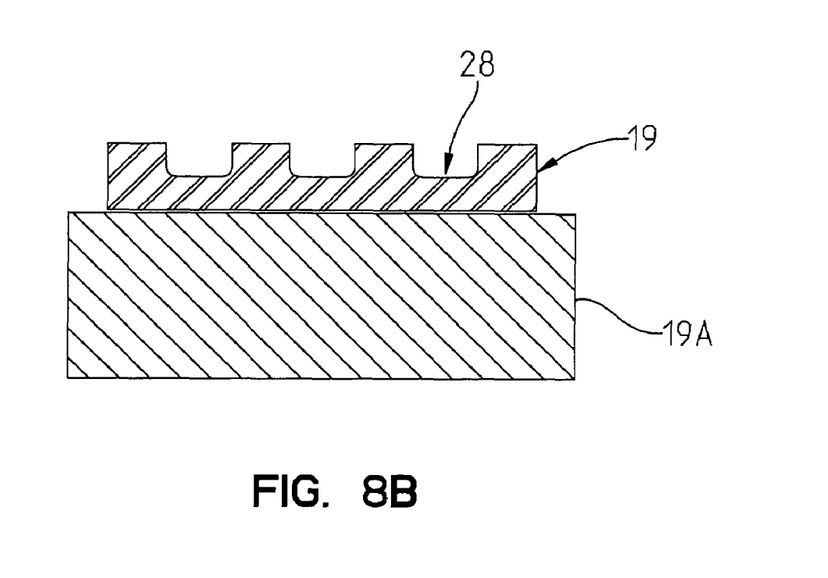
FIG. 8B is a sectional view, similar to FIG. 7, except that it shows the use of a film containing a series of dimples that is placed upon a hub having a generally smooth surface.

In the example shown in, FIGS. 3 and 8B, hub shell 12 may be assembled of multiple pieces or assemblies, including a cover portion formed as a removable skin 19. For instance, such a skin 19 may be a rubber-like material that slips over a metal hub 19A, allowing a retrofit. Such a skin may have surface features such as dimples 28, so that adding the skin 19 on top of a conventional hub provides aerodynamic advantages.

One method of forming dimples is by machining the dimples. When a set of dimples 28 are formed to each have respective center portions having a cylindrical nature, it has been found by the Applicants that it is best to machine such dimples by use of a five-axis machine that can produce dimples each having an axis that is perpendicular to the tangent of the hub cylindrical surface 18 at the point where the particular dimple is positioned. Alternately, such 'perpendicular-axis' dimples may be formed by using a single axis machine where an appropriate jig and fixture are employed to rotate the hub about its axis.

Figure 6:
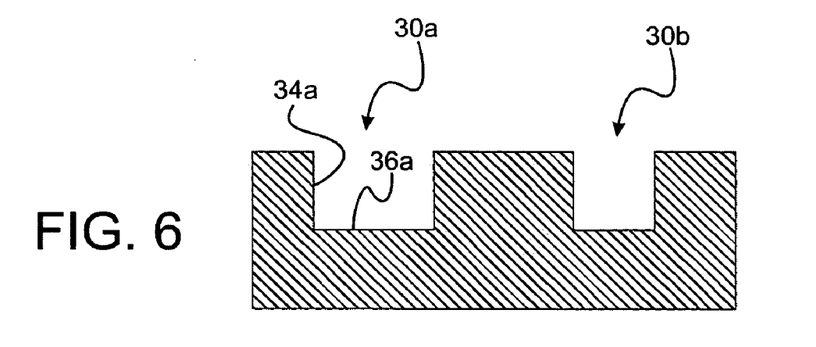
FIG. 6 is a sectional view of a cut through surface section of a hub shell, showing cylindrical-shaped dimples having planar bottom surfaces, according to an exemplary embodiment of the present invention.
Figure 7:
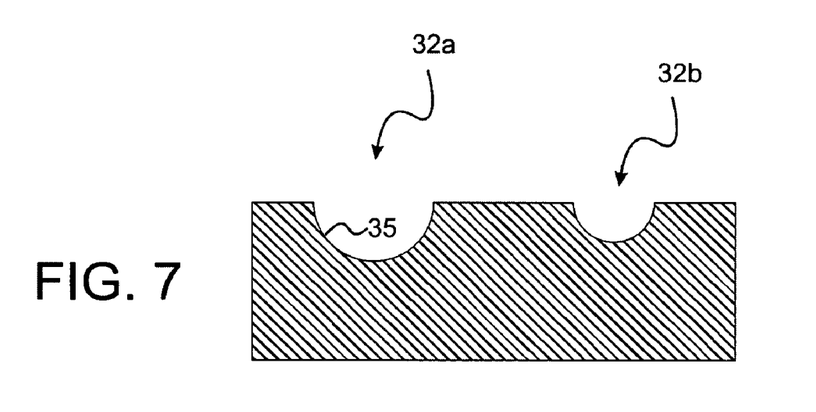
FIG. 7 is a sectional view, similar to FIG. 6, except showing the use of hemispherical dimples.

Dimples may be formed by machining them into the surface of hub shell 12 when hub shell 12 is composed of materials primarily having a metallic nature. However, a hub 10 made by a molding process may have the dimples molded into the hub during its manufacture. As shown in FIGS. 6, 7 and 8, dimples 30, 32 may be formed to have different cross sectional profiles. For example, FIG. 6 shows a large dimple 30a and a small dimple 30b, wherein each have a generally cylindrical side wall portion 34a and a generally planar bottom surface 36a.

By contrast, the dimples 32a, 32b shown in FIG. 7 each have an interior formed of a generally hemispherical surface 35. By further contrast, the dimples 37a, 37b shown in FIG. 8 are formed to include a generally cylindrical side wall portion 38a, and a generally hemispherical bottom portion 39a.

In addition, one or more protrusions (not shown) may be formed within the interior portion of a given dimple. For example, a dome or cone shaped protrusion may be formed on a bottom surface 36a of a dimple to change aerodynamic drag of a hub 10. An optimal relation between size of such an inner protrusion and a total volume of an interior portion of a dimple may depend on the ratio between total dimpled surface area versus non-dimpled surface area, or on other design criteria such as those determined by wind chamber tests and/or simulations.

Through the choice of appropriate tooling, dimples of a desired size and configuration may be chosen to meet the user's needs. It will also be appreciated that dimples having certain configurations (e.g. hexagonal shape) may be desirous to avoid if one is using a machine operation having a rotating tool, as such a dimple may unable to be produced without significant difficulty. However, if such dimples are formed by a molding process, a hexagonal shape may be very easily obtainable by a simple choice of an appropriate mold design.

Figure 4:
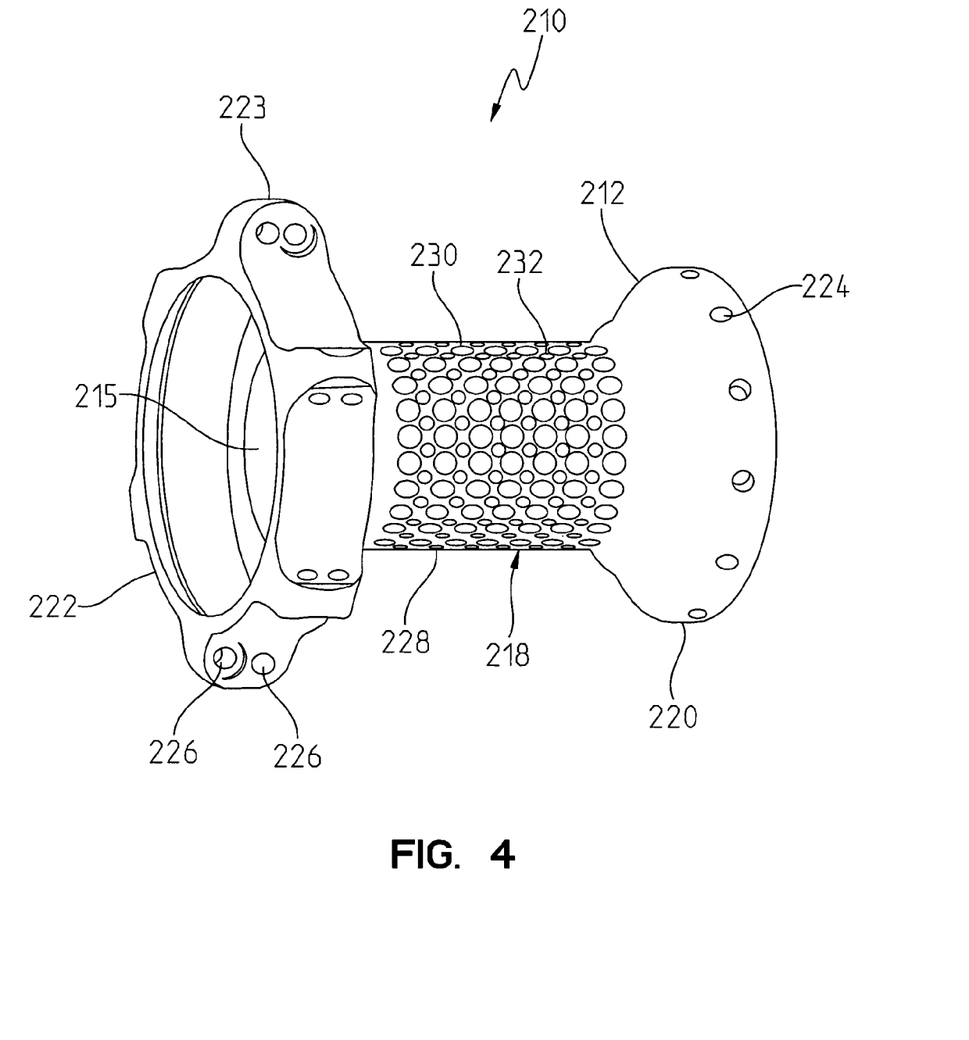
FIG. 4 is a perspective view of a hub for a driving wheel, such as a rear wheel of a bicycle, according to an exemplary embodiment of the present invention.

As shown by example in FIG. 4, a hub 210 is designed primarily for use with the driving wheel of a human powered vehicle, such as a rear wheel of a bicycle. Hub 210 includes a hub shell 212 having an axially extending interior passageway 215 into which a hub shaft (not shown) or cartridge or cassette body may be inserted. For example, such cassette bodies are distributed by Compositech, Inc., the Assignee of the instant invention, and such may be seen at www.zipp.com.

Hub 210 is similar to hub 10, with respect to various bearing packages and the like that may be contained within hub 210 or made a part of hub 210.

Hub 210 includes a cylindrical center portion 218, that is disposed between a first flange 220 disposed at one end of the cylindrical center portion 218, and a second flange 222 disposed at the second end of the hub shell 212. It will be noted that the second flange 222 is different than the second flange 22 shown in FIGS. 1-3, as second flange 222 is an "eared" flange. An "eared" flange is a flange that includes a plurality of radially outwardly extending ears 223. Ears 223 are shown by example to each include a pair of spoke-engaging second flange apertures 226 formed through ears 223 in an orientation optimized for securing proximal ends of corresponding spokes. In a manner similar to the spoke-securing orientation of apertures 24, 26 of FIG. 2, apertures 226 are preferably angled to secure individual spokes to be aimed directly at a center of a corresponding wheel rim. It should be noted that the relative positioning and orientation of the second flange apertures 226 formed on ears 223 is different than the positioning and orientation of first flange apertures 224 formed on the first flange 220.

In further detail, apertures 224 on the first flange 220 are preferably designed to place the spokes in a position wherein they extend generally perpendicular to the axis of hub 210. By contrast, the apertures 226 of the second flange 222 are positioned to enable the spokes to extend in a direction that is generally tangential to the cylindrical outer surface 228 of the cylindrical portion 218 of the hub 210. This tangential spoke placement better permits the spokes to transfer torque and power to the rim to which the spokes (not shown) and hub 210 are engaged.

The cylindrical center portion 218 of hub 210 also includes a dimpled surface area 228 that is similar in shape and position to the dimpled surface area 28 of the hub 10 shown in FIGS. 1-3. The dimpled surface area 228 preferably includes an alternating array of larger dimples 230 and smaller dimples 232, that may be arranged in a pattern generally similar to the pattern of dimples 30, 32 discussed above in connection with the device shown in FIGS. 1-3. Additionally, dimples 228 may have the same size and shape characteristics shown in the exemplary FIGS. 6-8, or they may be formed using other dimple designs, for example those discussed above.

Figure 5:
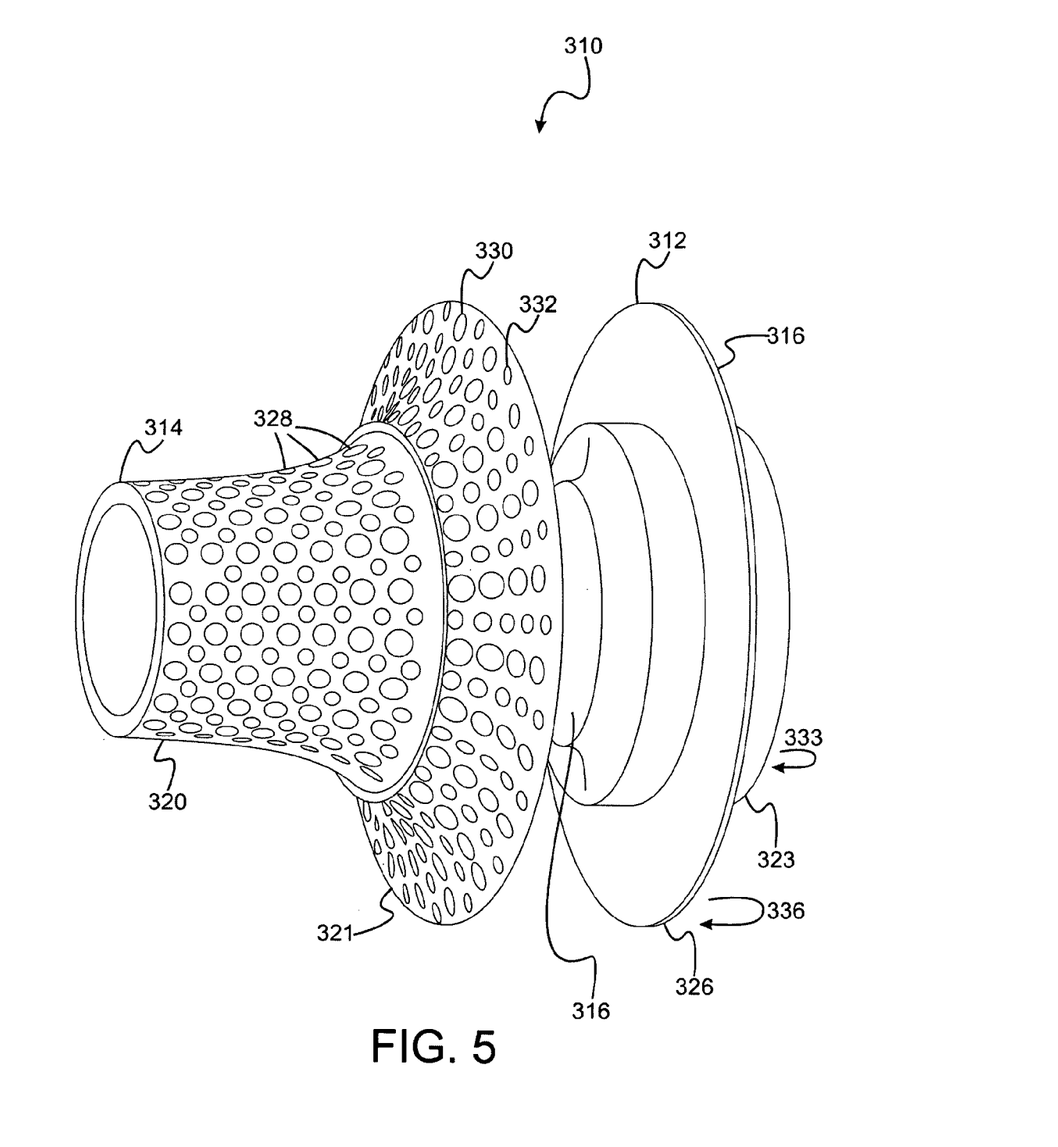
FIG. 5 is a perspective view of a hub useable with a disc-type wheel, according to an exemplary embodiment of the present invention.

An exemplary alternate embodiment hub 310 having an aerodynamic surface is shown in FIG. 5. Hub 310 is designed for use primarily with a disc-type wheel.

Because hub 310 is used in connection with a disc wheel, it will be noted that a central portion 316 of hub 310 does not include dimples, since central portion 316 resides interiorly of the central, hub receiving aperture of the corresponding disc wheel. Additionally, apertures do not exist for spokes, since a disc-type wheel does not have spokes that require apertures for connection points.

Hub 310 comprises a two-piece hub shell 312 that includes a main body portion 314 and a threaded-on flange portion 316. The main body portion 314 is preferably formed, generally, in a shape similar to a Civil War "Hardee hat," where such shape includes a crown portion 320 and a brim portion 321.

Figure 5A:
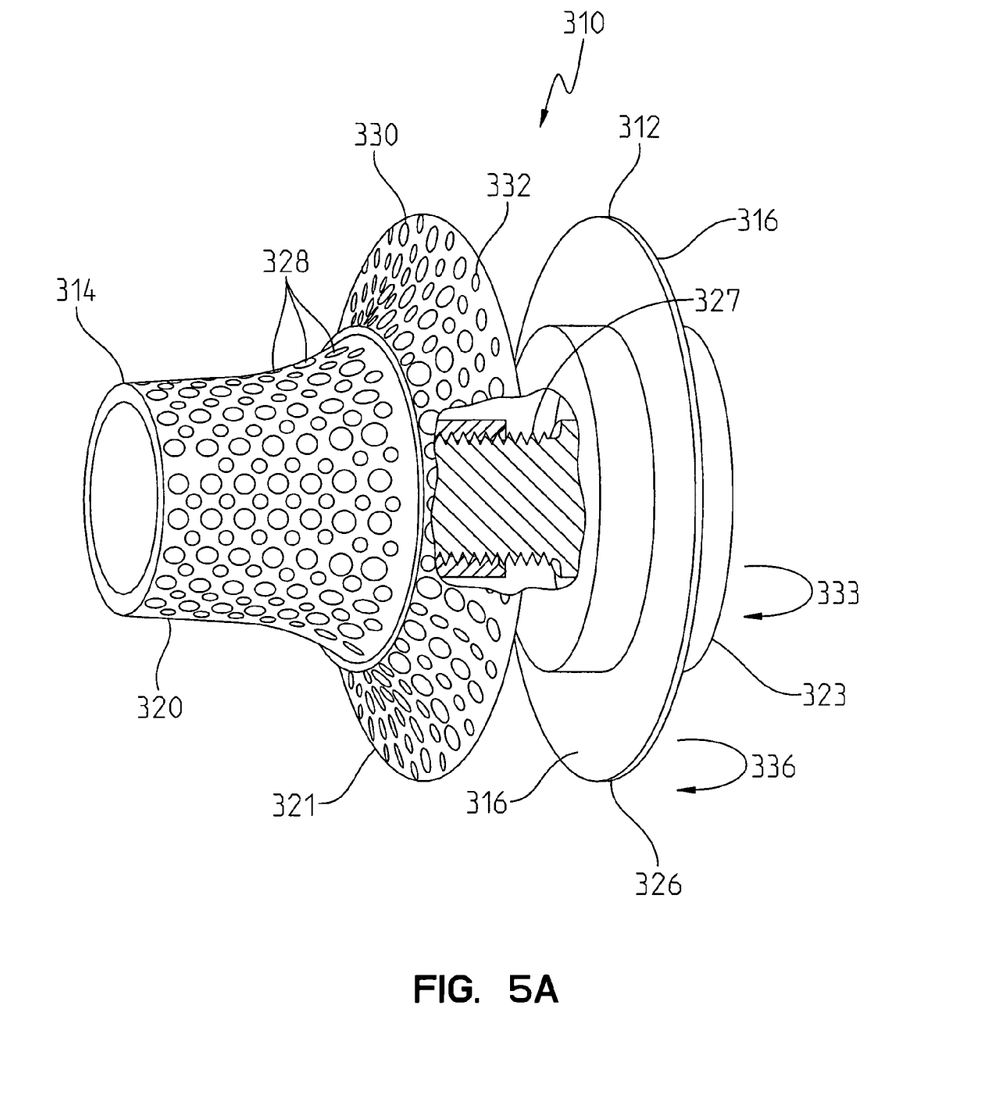
FIG. 5A is a perspective view of a hub, similar to the hub of FIG. 5, wherein the hub is partly broken away to illustrate the nut and bolt joinder arrangement for joining together the two hub portions.

As its name would suggest, the threaded-on flange 316 is threadedly engaged to the main body portion 314 to assemble hub 310. Threaded-on flange 316 includes a relatively flattened crown portion 323 and a brim portion 326. As shown in FIG. 5A, the threaded-on flange includes a threaded bolt portion 327 that is formed to threadedly engage a nut portion 329 of the main body portion 314. The nut portion 329 has matingly compatible threads to threadedly receive bolt portion 327.

Each of the crown and brim portion 323, 326 includes respective exteriorly facing surfaces 333, 336 that may include surface features such as dimples. However, the angle at which the threaded-on flange 316 is oriented in the drawing FIG. 5 prevents the dimples of such exteriorly facing surfaces 333, 336 from being shown both on the crown 323 and brim 326 portions.

Main body portion 314 in the illustrated example of FIG. 5 has a first contour forming the outer surface of crown portion 320 and a second contour forming the outer surface of brim portion 321. As shown, the two contour shapes abut on opposite sides of a 'ridge' separating the two curved surface shapes. The corresponding dimples 328 of the respective crown 320 and brim 321 may have different of the same dimple profiles, projection profiles, etc. The crown 320 and brim 321 may be formed as a unitary piece or may be separately formed and joined together by threads or other suitable structure. Together, the two surface contours may form a bell, hyperbolic, elliptical, or other shape.

The exteriorly facing surfaces of the crown 320 and brim 321 portion of main body portion 314 include surface features such as a dimple surface area 328, such features preferably including an alternating array of large and small dimples 330, 332. The dimples 330, 332 may be arrayed similarly to the manner in which the dimples are arrayed on the other exemplary embodiment hubs 10, 210 shown in other figures. Similarly, the dimples 330, 332, may have cross sectional profiles similar to those shown in FIGS. 6-8 and others as discussed above.

Figure 9:
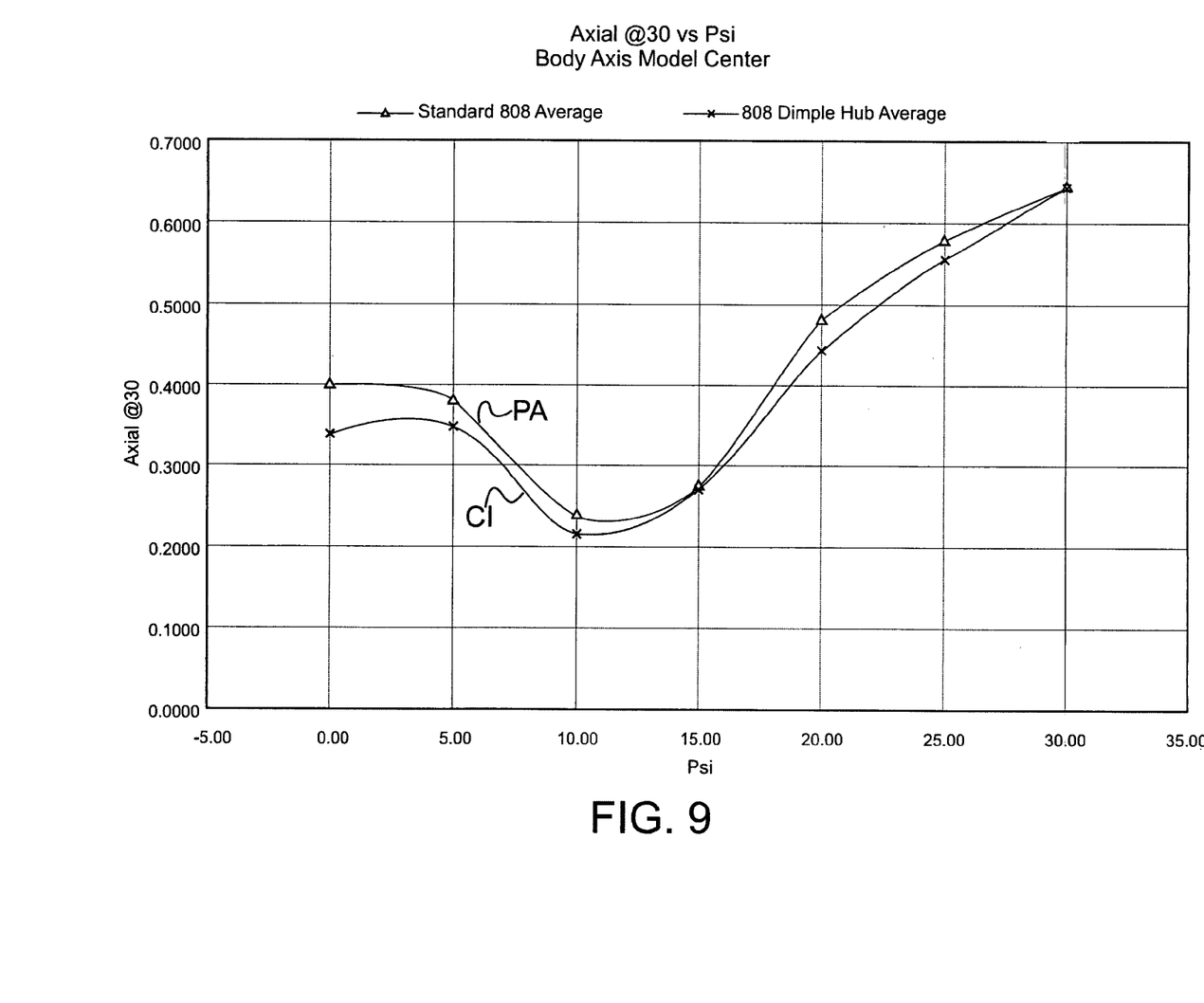
FIG. 9 is a graphical representation of performance data comparing performance of an example of an aerodynamic surfaced hub of the present invention against that of a prior art hub.

Referring now to FIG. 9, a graphical representation of test data illustrating the performance differences between a prior art "non-dimpled" hub ("PA"), and a "dimpled hub" ("CI") of the present invention is demonstrated.

To produce the graph shown in FIG. 9, a prior art hub PA was tested against a hub of the current invention C1. The hubs were generally of similar construction and shape and both generally resembled the hub 10 shown in FIG. 1. The primary difference between the two hubs was that the prior art hub PA did not have aerodynamic features on its surface, whereas the hub of the current invention CI did have aerodynamic features on its surface. In this particular test, the aerodynamic features were recessed dimple-like aerodynamic surface features similar to those shown in the hub 10 of FIG. 1.

In the FIG. 9 graph, it will be noted that two lines exist, including a first line PA that represents the performance of the prior art hub, and a second line CI that represents the performance of the hub 10 of the current invention. The vertical (Y) axis of the graph relates to aerodynamic resistance. As will be appreciated, a lower aerodynamic resistance value is preferred over a higher aerodynamic resistance factor. The horizontal (X) axis represents the angle of the hub relative to the direction of the wind. For example, point 0.00 on the X axis represents a point wherein the wind is perpendicular to the axis of the hub. Situations such as this occur when a rider is riding his bicycle directly into the wind. By contrast, point 15.00 on the X-axis represents the wind that one might encounter if, for example, one is riding into a wind having a direction that is disposed at about 15 degrees to the direction of travel of the bicycle, or that occurs if the wheel is being turned at a 15 degree angle.

It will be noted from the FIG. 9 performance chart that the hub of the current invention CI has less aerodynamic resistance than for the prior art PA hub, at all points on the graph from 0 to a 30 degree angle. Although the difference in aerodynamic resistance differs depending upon the attached angle of the hub with respect to the wind, it will be noted that a significant and sizable aerodynamic resistance difference exists at all points under 30 degrees, thus demonstrating the superiority of the current invention CI when compared to the prior art PA.

Variations in dimple geometries are envisaged. For example, a specification for diameters of multi-sided polygonally-shaped depressions may range from 0.2 to 0.4 inches, as is discussed in the incorporated Ording et al., '176 Application.

Although the Applicant has disclosed the best mode of practicing the invention perceived presently by the Applicant, it is to be understood that specific disclosed embodiments are by way of example and are not limiting. Consequently, the reader will understand that variations and modifications exist within the scope and spirit of the present invention. It is intended that the appended claims be construed to include alternative embodiments to the extent permitted by the prior art.

What is claimed is:

1. A hub for a human powered vehicle, comprising:
   a rotation axis;
   a hub body formed generally symmetrically about the rotation axis, the hub body having a radially-outward-facing surface that includes a plurality of surface features designed for creating a turbulent boundary layer when the hub travels through air for improving the aerodynamic efficiency of the hub as it passes through a fluid; and
   a wheel assembly attachment member formed along a circumference of the hub body, the wheel assembly attachment member being structured for attachment to one of a plurality of spokes and the center of a disc wheel.

2. The hub of claim 1 wherein the surface features include a series of depressions.

3. The hub of claim 2 wherein the series of depressions includes a series of dimple-shaped depressions.

4. The hub of claim 2 wherein the series of depressions includes depressions each having a cylindrical wall and having one of a planar bottom and a hemispherical bottom.

5. The hub of claim 2 wherein the series of depressions comprises hemispherically shaped dimples.

6. The hub of claim 2 wherein the wheel assembly attachment member comprises first and second flange portions, at least one of the first and second flange portions including a plurality of spoke-receiving apertures disposed around a circumference thereof, the hub body has a cylindrical portion disposed between the first and second flange portions, and wherein the series of depressions extend longitudinally along the cylindrical portion of the hub body.

7. The hub of claim 2 wherein the hub shell comprises first and second cover portions adapted for coaxially securing a disc type wheel body to the hub, and wherein the series of depressions are disposed on at least one of the first and second cover portions.

8. The hub of claim 7 wherein at least one of the first and second cover portions is formed with a bell-shaped profile.

9. The hub of claim 8 wherein the bell-shaped profile of the one cover portion has a first contour and a second contour, the first and second contours abutting at an annular ridge formed coaxially with the hub axis.

10. The hub of claim 8 wherein the first and second cover portions are formed to removeably interlock with one another.

11. The hub of claim 10 wherein the first and second cover portions are respectively formed as a bolt and nut having matingly compatible threads.

12. The hub of claim 1 wherein the surface features include a series of protrusions.

13. The hub of claim 12 wherein the protrusions are each formed with a cylindrical wall and one of a planar top and a hemispherical top.

14. The hub of claim 2, wherein the plurality of surface features comprise multi-sided polygonally shaped depressions.

15. The hub of claim 14, wherein the multi-sided polygonally shaped depressions are of multiple diameters.

16. The hub of claim 15, wherein the diameters of the multi-sided polygonally shaped depressions range from 0.2 to 0.4 inches.

17. A hub assembly for a human powered vehicle, the hub assembly comprising:
   a wheel shaft coupled to a frame of the vehicle; and
   a hub shell rotatable with respect to the wheel shaft, the hub shell including an external cover portion and a support member for fixedly connecting the hub to a tire engaging member, the cover portion including a plurality of surface features designed to create a turbulent boundary layer when the hub travels through air to reduce aerodynamic drag.

18. The hub assembly of claim 17 wherein the plurality of surface features comprises at least first and second sets of dimples, the dimples of each respective set being identically shaped with respect to one another.

19. The hub assembly of claim 18 wherein the cover portion has an exterior surface, wherein the dimples each have a diameter defined at a respective dimple opening along the exterior surface, and wherein the diameters of the dimples of the first set are larger than the diameters of the dimples of the second set.

20. The hub assembly of claim 18 wherein the dimples of the first set are interspersed in an alternating arrangement with the dimples of the second set.

21. The hub assembly of claim 20 wherein dimples of the first set are positioned in groups of first rows, the dimples of the second set are positioned in groups of second rows, and wherein the alternating arrangement is defined as an alternating of the first and second rows along a circumference of the cover portion.

22. The hub assembly of claim 21 further comprising a third set of dimples positioned in at least one ring around the circumference of the cover portion.

23. The hub assembly of claim 22 wherein the dimples of the third set are identically shaped with respect to one another.

24. The hub assembly of claim 17, wherein the surface features include a plurality of multi-sided polygonally shaped surface features arranged as a first pattern in a first zone and a second pattern in a second zone located radially outward from said first zone.

25. The hub assembly of claim 24, wherein density of surface features in the second zone is greater than density of surface features in the first zone.

26. The hub assembly of claim 17 wherein the cover portion comprises a removable skin.

27. The hub assembly of claim 26 wherein the removable skin is formed of a flexible rubber-like material.

28. A hub for a human powered vehicle comprising:
   a hub shaft that can be coupled to a bicycle frame; and
   a hub shell rotatable with respect to the hub shaft, the hub shell including an external cover portion and a support member for fixedly engaging the hub to a tire engaging member, the cover portion including a first dimple set having a plurality of dimples each having a first size and including a second dimple set having a plurality of dimples each having a second size, the dimples being designed to create a turbulent boundary layer when the hub travels through air to reduce aerodynamic drag,
   wherein the first and second dimple sets are respectively arranged in rows disposed longitudinally along the external cover portion of the hub shell, and wherein rows of the first and second dimple sets alternate with respect to one another along a circumference of the external cover portion of the hub shell.

* * * * *